United States Patent Office 2,847,713
Patented Aug. 19, 1958

2,847,713

PROCESS FOR PRODUCING SYNTHETIC SAUSAGE SKINS AND OTHER LAMINAR STRUCTURES FROM ALGINATES

Richard Weingand, Walsrode, Germany

No Drawing. Application May 13, 1955
Serial No. 508,325

1 Claim. (Cl. 18—57)

The present invention relates to a process for producing synthetic sausage skins and other laminar structures from alginates.

In the production of artificial sausage skins consisting of an alginate or of alginic acid, particularly those which are to be used as edible substitutes for natural thin-walled sausage casings in the manufacture of weiners and frankfurters, high requirements have to be met as regards mechanical strength and structural properties of the finished casings.

When edible synthetic sausage casings are made from alginates, the high longitudinal and transverse strength necessary for the filling operation cannot be obtained by increasing the wall-thickness because this would be unpleasant and might even cause indigestion when the skin is not removed before the sausage is eaten. Furthermore, mere mechanical strength is not enough to meet all the practical requirements of synthetic sausage casings particularly of edible synthetic thin-walled sausage skins which must have for satisfactory filling, a wall of high extensibility and elasticity.

While it is true that all the mentioned requirements can be met when alginates of high intrinsic viscosity are used for making the casings consisting of alginic acid or of an alginate, the processing of such highly viscous alginates is very difficult from a technical point of view: To start with, highly viscous alginates are had to dissolve; filtration of the highly viscous alginate solution requires filters of very large dimensions and yet proceeds very slowly; the same is true of the likewise indispensable de-aerating process of the solution.

These difficulties are further increased by the fact that the alginate solution which is to be extruded should have considerable body, i. e. should have a maximum concentration in alginate since this, too, will help the skins in attaining the desirable properties of strength and structure. However, as the concentration increases, so does the viscosity of the alginate solution and this in turn leads to greater filtration and de-aeration difficulties.

It is the object of the present invention to overcome all these inconveniences and to provide a simple process of making from alginates edible synthetic sausage casings and similar laminar structures having very good qualities in every respect. According to the invention, the object is achieved by using an alginate of high intrinsic viscosity as a starting material and by maintaining a moderately elevated temperature while performing all operations necessary in the production of synthetic sausage casings and the like from alginates, i. e. the preparing and the shaping of the alginate solution of high viscosity, as well as the coagulation of the casing and the other processing steps necessary in the production of the finished casings. Contrary to what would be expected, the normally occurring degradation of alginates at increased temperature can be avoided by correct adjustment of intensity and duration of the heat treatment.

For practical purposes temperatures of 50–60° C. will be adequate; it was found that alginate solutions can be maintained at those temperatures for 3 to 4 hours without any sign of degradation. In any individual case, the temperature and duration of heating will depend on the intrinsic viscosity of a particular alginate and on the concentration of the alginate solution, and they will be higher with the increase of the values of viscosity and concentration within the limits determined by the danger of degradation. During filtration, temperatures as high as reasonably possible should be maintained, while for de-aeration of the solution, lower temperatures can be chosen when the solution is spread in a layer.

If desired, an excessive degradation of the alginate can be avoided by choosing an alginate of such high natural viscosity that a certain degradation will not matter. If, between the several operations required in the production of the casings, longer intervals are necessary for operational reasons, it is advisable to cool down the solutions during these periods to about +30° C. in order to avoid degradation. The concentration of the alginate solution is preferably over 5%.

The invention will now be more fully described by way of an example, but it should be understood that this is given by way of illustration and not of limitation and that many changes can be made in the details without departing from the spirit of the invention.

*Example*

A 6% solution is made from an alginate having an intrinsic viscosity of 30 centipoises in 0.3% solution at 20° C.; the solution is heated to 50° C. and filtered as well as de-aerated at this temperature. Thereafter, while the temperature is still maintained at 50° C., the solution is passed through an annular orifice, and from there to precipitating and rinsing baths. The synthetic sausage casing thus obtained has a diameter of 25 mm., a wall thickness of 0.01 mm. and a bursting strength of more than 2.0 m. water column the elastic extensibility is very good.

Alginates having a lower natural viscosity than 30 centipoises may likewise be used for the purpose of the present invention, as long as they are above a lower limit of 10 centipoises, measured in a 0.3% solution at 20° C.

What I claim is:

In the process of producing synthetic sausage casings from an alginate solution, by the steps of filtering said solution, deaerating said solution and extruding said solution through an annular orifice, whereby an extruded tube is produced, coagulating and rinsing the extruded tube, the improvement which comprises employing an alginate solution having a concentration of at least 5%, an intrinsic viscosity of at least 10 centipoises measured in a 0.3% solution at 20° C., maintaining said solution during all of the steps of said process at a temperature of 50 to 60° C. and cooling the solution to 30° C. during any interval between two of said steps of a duration of as long as three hours.

References Cited in the file of this patent

UNITED STATES PATENTS

| | | |
|---|---|---|
| 1,348,459 | Swett | Aug. 3, 1920 |
| 2,513,416 | LeGloahec | July 4, 1950 |